(12) United States Patent
Farjadrad

(10) Patent No.: US 9,048,934 B1
(45) Date of Patent: Jun. 2, 2015

(54) VOLTAGE MODE DRIVER WITH ENHANCED TRANSMIT HYBRID CIRCUIT

(75) Inventor: Ramin Farjadrad, Los Altos, CA (US)

(73) Assignee: Aquantia Corp., Milpitas, CA (US)

( * ) Notice: Subject to any disclaimer, the term of this patent is extended or adjusted under 35 U.S.C. 154(b) by 473 days.

(21) Appl. No.: 13/346,534

(22) Filed: Jan. 9, 2012

(51) Int. Cl.
*H04B 1/38* (2006.01)
*H04B 3/54* (2006.01)
*H04L 7/00* (2006.01)

(52) U.S. Cl.
CPC .............. *H04B 3/542* (2013.01); *H04L 7/0091* (2013.01)

(58) Field of Classification Search
CPC ...................................................... H04L 7/0091
USPC .......................................................... 375/219
See application file for complete search history.

(56) References Cited

U.S. PATENT DOCUMENTS

| 7,221,196 | B2 | 5/2007 | Shirani | |
|---|---|---|---|---|
| 7,528,629 | B2 | 5/2009 | Farjadrad et al. | |
| 7,729,464 | B2 * | 6/2010 | Taich et al. | 375/358 |
| 2009/0316764 | A1 * | 12/2009 | Roth | 375/219 |
| 2011/0194219 | A1 * | 8/2011 | Tailliet | 361/56 |

* cited by examiner

*Primary Examiner* — Lihong Yu
(74) *Attorney, Agent, or Firm* — Lance Kreisman; Peninsula Patent Group

(57) ABSTRACT

A voltage mode transceiver having an input/output (I/O) node for coupling to a bidirectional signaling link is disclosed. The transceiver includes a transmit circuit having an output coupled to the node and a receive circuit. The transmit circuit includes a transmit digital-to-analog converter (DAC) circuit having a transmit impedance network and a hybrid impedance network. The transmit impedance network generates an analog transmit version of a digital data signal while the hybrid impedance network couples to the transmit impedance network to generate an analog mirror version of the digital data signal. The receive circuit has a first input coupled to the I/O node and a second input coupled to receive the analog mirror version of the digital data signal.

10 Claims, 6 Drawing Sheets

$V_{ThV} = (R_{TxS})/(R_{TxD} + R_{TxS})V_{dd}$
$R_{Tx} = R_{TxD} || R_{TxS}$ $V_{ThV} = (R_{TxD}||R_{TxS})/(R_{TxM}+R_{TxD}||R_{TxS})V_{MID} + (R_{xM}||R_{TxS})/(R_{TxD}+R_{TxM}||R_{TxS})V_{dd}$
$R_{Tx} = R_{TxD} || R_{TxS} || R_{TxM}$

Assuming zero switch resistance:
$R_{Tx} = R_{Tx1} || R_{Tx2} || ..... || R_{TxN}$
$R_{Hr} = R_{Hr1} || R_{Hr2} || ..... || R_{HrN}$

US 9,048,934 B1

VOLTAGE MODE DRIVER WITH ENHANCED TRANSMIT HYBRID CIRCUIT

TECHNICAL FIELD

The disclosure herein relates to electronic communications, and more particularly to bi-directional wire-line communications in high-speed ethernet cable systems.

BACKGROUND

10 Gigabit Ethernet is an increasingly popular communication standard, with a nominal data rate of 10 Gbit/s. One form of 10 Gigabit Ethernet is IEEE 10GBASE-T, used to provide 10 gigabit per second connections over unshielded or shielded twisted pair copper wires. Multiple pairs of the wires are provided that define multiple physical channels. Each channel serves as a bi-directional signaling link that simultaneously routs data in both transmit and receive directions. For a given data transmission, the receiver end of the link that receives the transmission generally needs to cancel its own transmit signal back the other way, or the signals become superimposed on each other leading to faulty data reception. The circuit that carries out this transmit cancellation is generally known as a transmit hybrid circuit. Applications such as 10GBASE-T often desire 60 dB of cancellation by the transmit hybrid circuit.

FIG. 1 illustrates a conventional transmit hybrid circuit 100 for high-speed Ethernet applications. The circuit includes a transceiver 102 that includes a transmitter 104 and a receiver 106. The transmitter includes a first voltage mode digital-to-analog converter DAC1 that receives a digital data input DATA, and generates an analog voltage output across a transmit impedance network $R_{Tx}$. The output couples to an input/output (I/O) node 110. A second digital-to-analog converter DAC2 also receives the digital data input and generates a mirror copy of the analog output voltage across a hybrid impedance network $R_{Hr}$. The mirror voltage output is fed to one input of the receiver 106 and coupled to a receiver impedance network RTr, while the other output of the receiver couples to the I/O node 110. The I/O node 110 connects to a bidirectional link 114 that has an opposite end connected to a link partner transceiver (not shown).

While the conventional transmit hybrid circuit described above works well for its intended applications, the dual DAC configuration presents power and accuracy problems. While multiple DACs provide a certain level of programmable flexibility, the power dissipation may be unacceptable for certain low-power environments. Further, the transmit output voltage and the hybrid voltage need to be matched within a certain level of precision in order to cancel the effects of the superimposed transmit signal within the desired 60 dB level. This is very difficult to do with multiple DACs, and the result often includes a nonlinear voltage mismatch.

What is needed is a more power-efficient and accurate way to carry out transmit hybrid functions in high-speed Ethernet circuits.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 4 illustrates further detail of the transmit hybrid circuit employing the resistive network of FIG. 3a;

DETAILED DESCRIPTION

Embodiments of a transmit hybrid circuit and associated methods of operation are disclosed. In one embodiment, a voltage mode transceiver having an input/output (I/O) node for coupling to a bidirectional signaling link is disclosed. The transceiver includes a transmit circuit having an output coupled to the node and a receive circuit. The transmit circuit includes a transmit digital-to-analog converter (DAC) circuit having a transmit impedance network and a hybrid impedance network. The transmit impedance network generates an analog transmit version of a digital data signal while the hybrid impedance network couples to the transmit impedance network to generate an analog mirror version of the digital data signal. The receive circuit has a first input coupled to the I/O node and a second input coupled to receive the analog mirror version of the digital data signal.

In a further embodiment, a method of receiving a signal along a bidirectional signaling link is disclosed. The method includes generating a digital transmit data signal, then converting the digital transmit data signal to an analog voltage mode transmit signal by a first digital-to-analog converter (DAC). The transmit signal is transmitted at one end of the link by a transmit portion of a transceiver circuit. The digital transmit data signal is also converted to an analog voltage mode hybrid signal by the DAC. The hybrid signal is applied to a receiver portion of the transceiver circuit. The receiver portion and the transmit portion share a common node. The method further includes generating a second transmit signal from the other end of the link, and simultaneously receiving the hybrid signal, the transmit signal and the second transmit signal at the receiver portion. The transmit signal is cancelled at the receiver portion with the hybrid signal.

Figure 1:
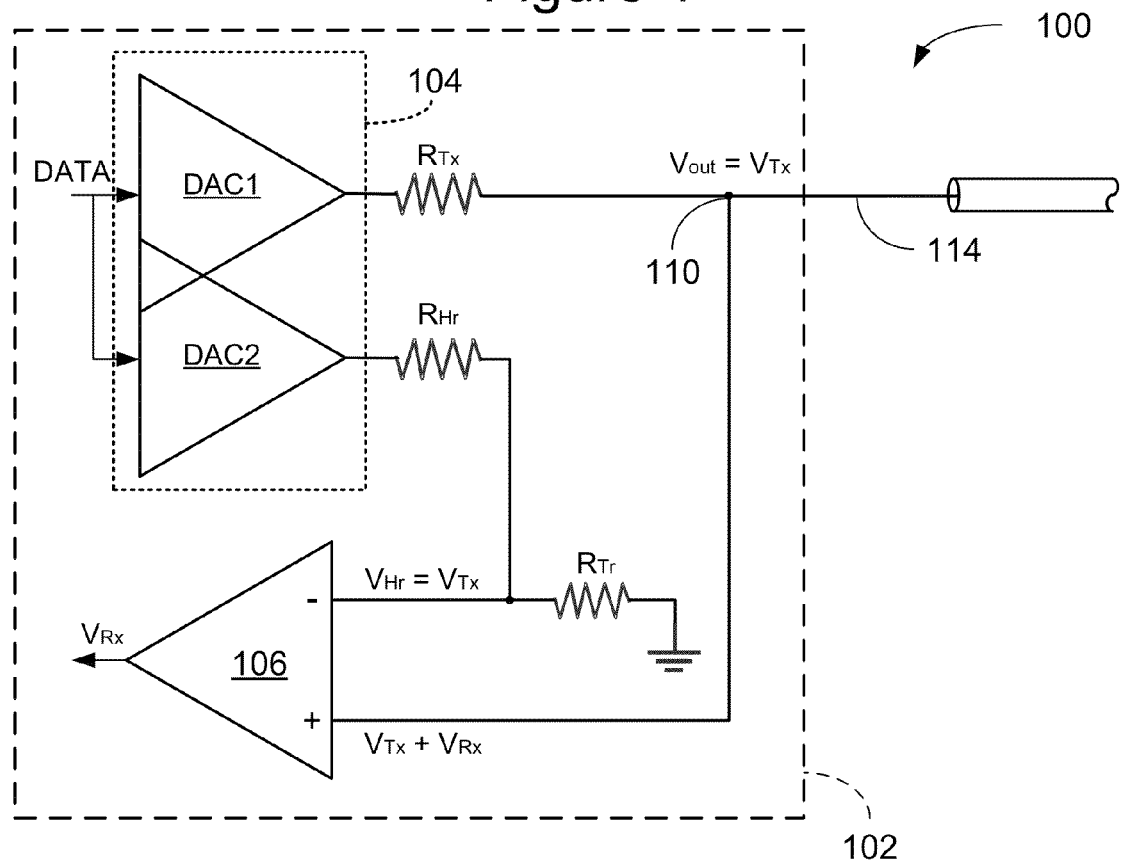
FIG. 1 illustrates a conventional transmit hybrid circuit for the 10GBASE-T communication standard.
Figure 2:
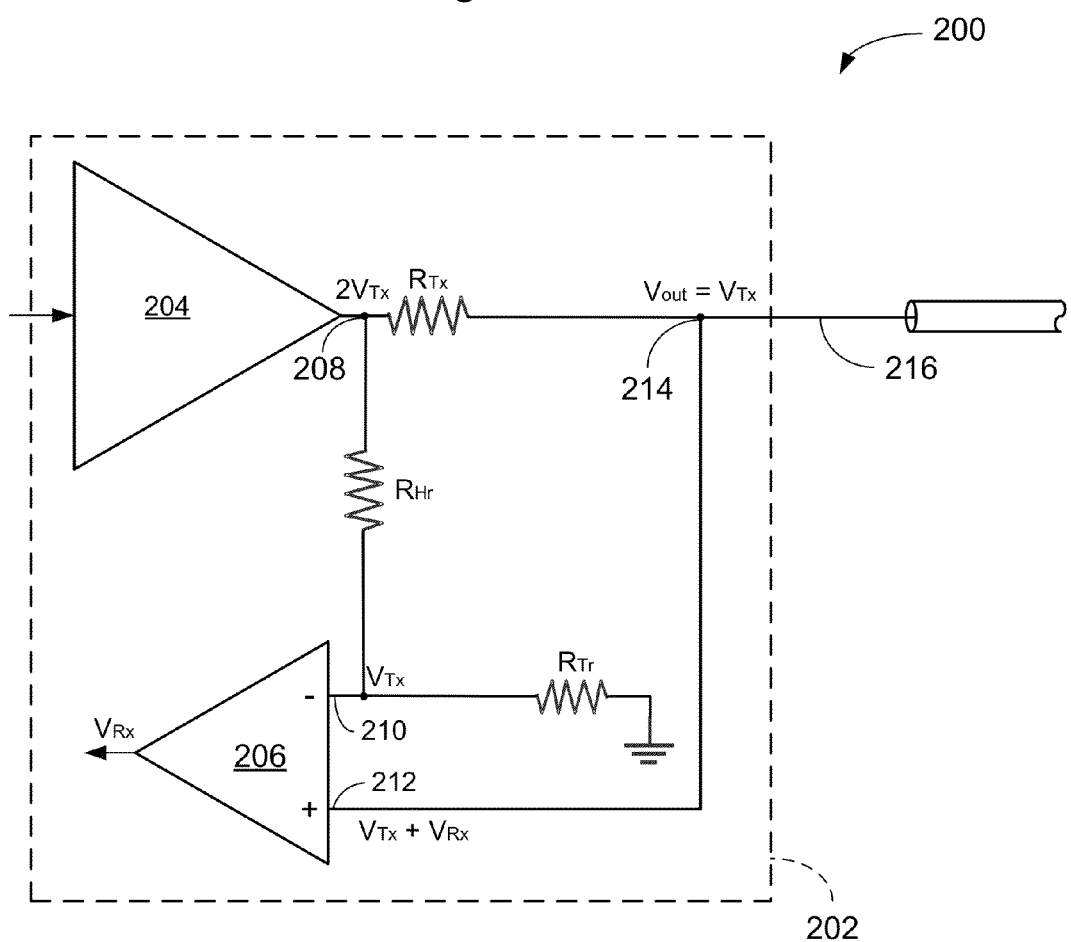
FIG. 2 illustrates a high-level transmit hybrid circuit architecture according to one embodiment.

FIG. 2 illustrates a high-level embodiment of a transmit hybrid circuit, generally designated 200, that provides enhanced power efficiency and accuracy. The circuit includes a first transceiver 202 having a transmit circuit in the form of a voltage mode DAC 204 and a receiver 206. The voltage mode DAC generates a voltage output of twice the desired transmit voltage $2V_{TX}$ that is fed to a common node 208.

With continued reference to FIG. 2, the transceiver 202 employs a plurality of impedance networks. A transmit impedance network $R_{Tx}$, having an impedance that substantially matches the characteristic impedance $Z_{LINE}$ of the link, couples to the common node 208. In a similar manner, one end of a hybrid impedance network $R_{Hr}$ also couples to the common node 208. The hybrid impedance is also matched to the characteristic impedance. The other end of the hybrid impedance network ties to a receiver impedance network $R_{Tr}$, which also matches the characteristic impedance. The other end of the receiver impedance network is coupled to a ground voltage level. Alternatively, the hybrid resistor network does not need to have $R_{Hr}$ and $R_{Tr}$ matched to $R_{Tx}$ and $Z_{LINE}$, respectively. As long as a transmit replica voltage is generated at the node 210 that is the same as $V_{Tx}$, the architecture described above operates optimally. For example, $R_{Hr}$ and $R_{Tr}$ may both be half the size of $R_{Tx}$ and $Z_{LINE}$.

Further referring to FIG. 2, the receiver 206 includes an inverting input 210 that ties to the hybrid impedance network and the receiver impedance network. The resulting voltage divider configuration, with the impedance networks being equal, results in the receiver input seeing a voltage that is half the transmit DAC output voltage (which is $2V_{Tx}$). The receiver includes a noninverting input 212 that couples to an I/O node 214. The I/O node forms a junction between the transmit circuit and the receiver circuit, being coupled to the transmit impedance network $R_{TX}$ and the noninverting receiver input 212. The I/O node also provides the connection point for interfacing with a bidirectional link 216.

In operation, the transceiver 202 transmits and receives signals to and from the bidirectional link simultaneously. Thus, as the receiver 206 receives voltage mode data signals $V_{Rx}$ from the link via the I/O node 214, any simultaneously transmitted signals $V_{TX}$ from the transmitter 204 also show up at the node, and are fed back to the receiver along with the received signals. Thus, the noninverting receiver input sees input signals of $V_{Rx}+V_{Tx}$. As signals are transmitted by the transmit circuit however, the hybrid impedance network taps the signals present on the common node 208, and feeds the signal to the inverting receiver input 210. The voltage $V_{Tx}$ at the inverting input is summed with the voltage at the noninverting input $V_{Tx}+V_{Rx}$, and the result being solely the receive voltage $V_{Rx}$.

While the embodiment of FIG. 2 illustrates a single-ended implementation, a differential implementation of a transmit hybrid circuit is also envisioned where the receiver would have a pair of complementary inputs for the transmit replica signal, and a pair of complementary inputs for the received signal. Alternatively, the transmit replica and receive signal may be subtracted in other ways, such as through a wired OR passive network, and not necessarily connected to two distinct terminals of a receiver block.

Figure 3A:
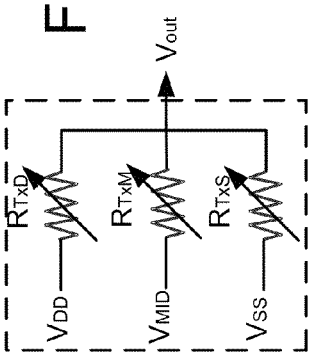
FIGS. 3a-3c illustrate a resistor structure and Thevenin equivalent circuits for use in the circuit architecture of FIG. 2 according to one embodiment.
Figure 3B:
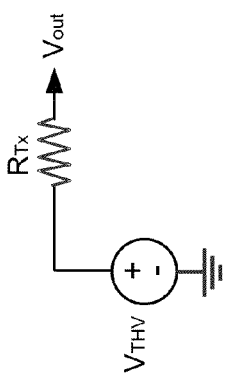
Figure 3C:
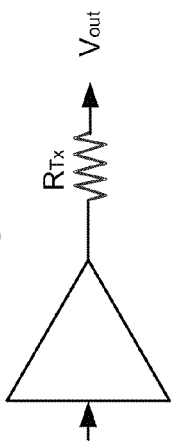

FIGS. 3a-3c illustrate further details regarding one embodiment of a portion of the transmit impedance network $R_{Tx}$. The network includes multiple parallel variable resistor legs $R_{TxD}$ and $R_{TxS}$ that are each tied at one end to respective power supplies, such as $V_{DD}$ and $V_{SS}$, and having other ends tied to a common output node 302. The variable resistor legs, in turn, are realized by plural resistor fingers that cooperate to programmably generate a desired impedance value, while the parallel value of all variable resistors is kept constant. The Thevenin equivalent circuit is illustrated in FIG. 3b, and can be characterized as: $V_{THV}=V_{DD}(R_{TxD}\|R_{TxS})/(R_{TxD}+R_{TxD}\|R_{TxS})$, with $RTx=R_{TxD}\|R_{TxS}$, where RTx is a constant value. FIG. 3c illustrates a voltage mode driver in the form of a DAC 304 corresponding to the Thevenin circuit of FIG. 3b.

Figure 3D:
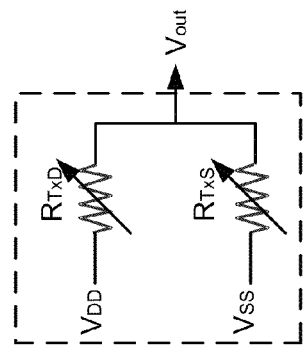
FIGS. 3d-3f illustrate a further embodiment of a resistor structure similar to that shown in FIGS. 3a-3c.
Figure 3E:
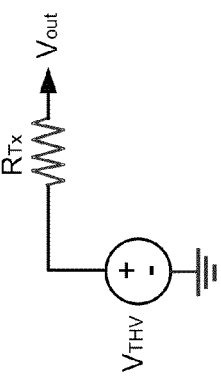
Figure 3F:
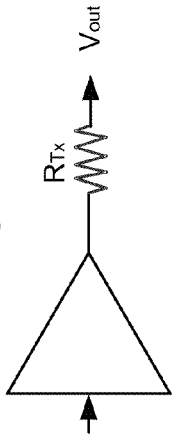

FIGS. 3d-3f illustrate further detail regarding another embodiment of a portion of the transmit impedance network similar to that of FIGS. 3a-3c. The network includes not only high and low power supplies $V_{DD}$ and $V_{SS}$ to respective resistor legs $R_{TxD}$ and $R_{TxS}$, but also a third power supply voltage $V_{Mid}$ that is between the high and low supply voltages. Switches (not shown) disposed between the high and low resistor legs and supply voltages provide for only one of the high or low power supply legs being active at any given time. The parallel resistance with the middle leg thus results in further power efficiency. FIG. 3e illustrates the Thevenin equivalent circuit, where $V_{THV}=V_{DD}(R_{TxM}\|R_{TxS})/(R_{TxD}+R_{TxM}\|R_{TxS})+V_{Mid}(R_{TxD}\|R_{TxS})/(R_{TxM}+R_{TxD}\|R_{TxS})$, with $RTx=R_{TxD}\|R_{TxS}\|R_{TxM}$, where RTx is a constant value. FIG. 3f illustrates a voltage mode driver in the form of a DAC 306 corresponding to the Thevenin circuit of FIG. 3e.

Figure 4:
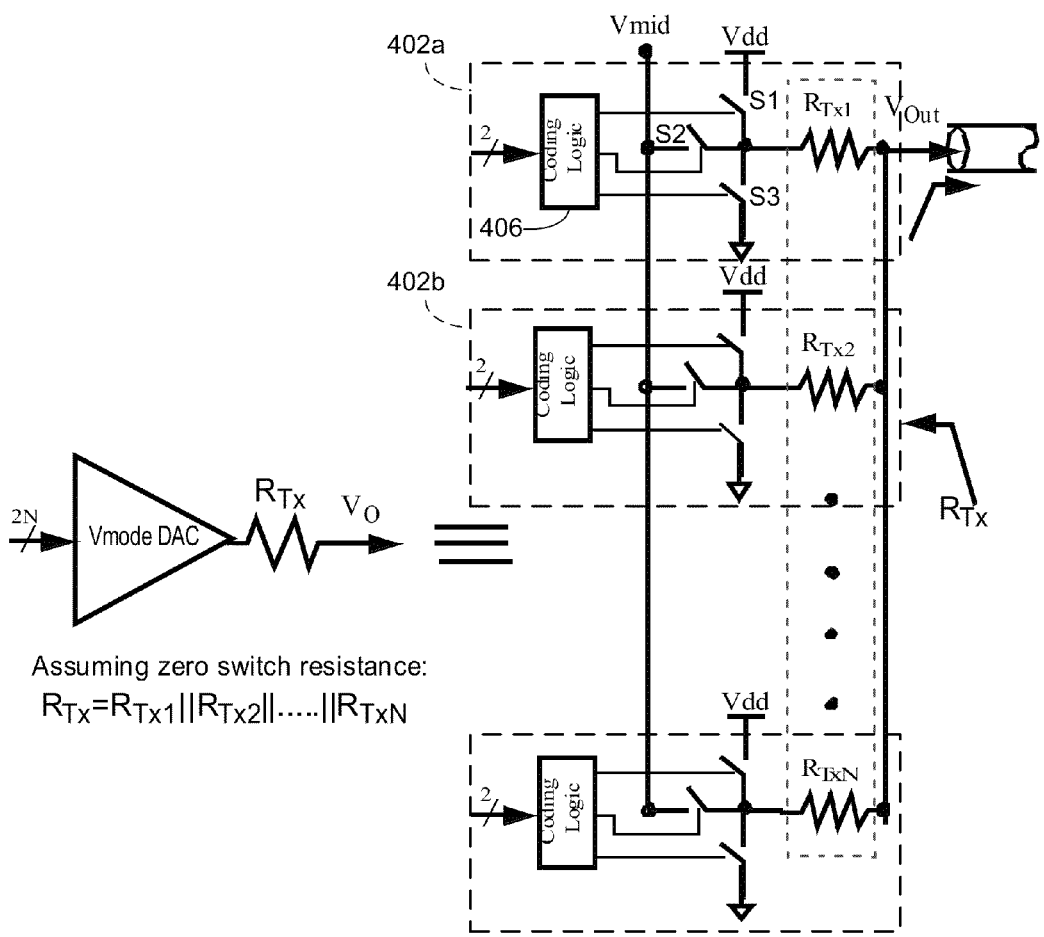

FIG. 4 provides further detail of one embodiment of the voltage mode transmit DAC that employs the transmit impedance network consistent with the resistor network shown in FIGS. 3d-3f. As noted earlier, the combination of resistor legs, such as $R_{TxD}$, $R_{TxM}$ or $R_{TxS}$, are created by a plurality of resistor finger circuits, such as 402a, 402b, etc. Each resistor finger circuit, such as 402a, includes a fixed resistor $R_{Tx1}$, having one end coupled to an output node $V_{out}$. The other end couples to a switch network of switches S1, S2 and S3 that selectively couples the resistor to either the high $V_{DD}$, mid $V_{Mid}$ or low $V_{SS}$ power supply voltages. The total network impedance looking into the node $V_{on}$, is thus the parallel configuration of all of the resistor fingers. Assuming that the switch resistances are negligible, the total network impedance is $R_{Tx}=R_{Tx1}\|R_{Tx2}\|\ldots\|R_{TxN}$. In the case of resistance of the switches are not negligible compared to the finger resistor ($R_{Txi}$), the effective resistance of each finger is the sum of the switch resistance and fixed resistance, i.e. $R_{Tx2}+Rsw$.

Further referring to FIG. 4, the switches S1-S3 are responsive to coding logic 406 that receives a 2-bit control input signal that specifies the coupling of the fixed resistor to one of the three possible power supplies. The voltage across the fixed resistor thus depends on the coded input to the coding logic. Each of the resistor fingers are constructed similarly, and all aggregate their voltage outputs to the output node $V_{out}$. With the coding logic properly programmed, and an adequate number of resistor fingers available, a fine resolution transmit DAC may be realized through various ratios of the resistor fingers 402a-402N to the power supply voltages $V_{DD}$, $V_{Mid}$ and $V_{SS}$.

Figure 5:
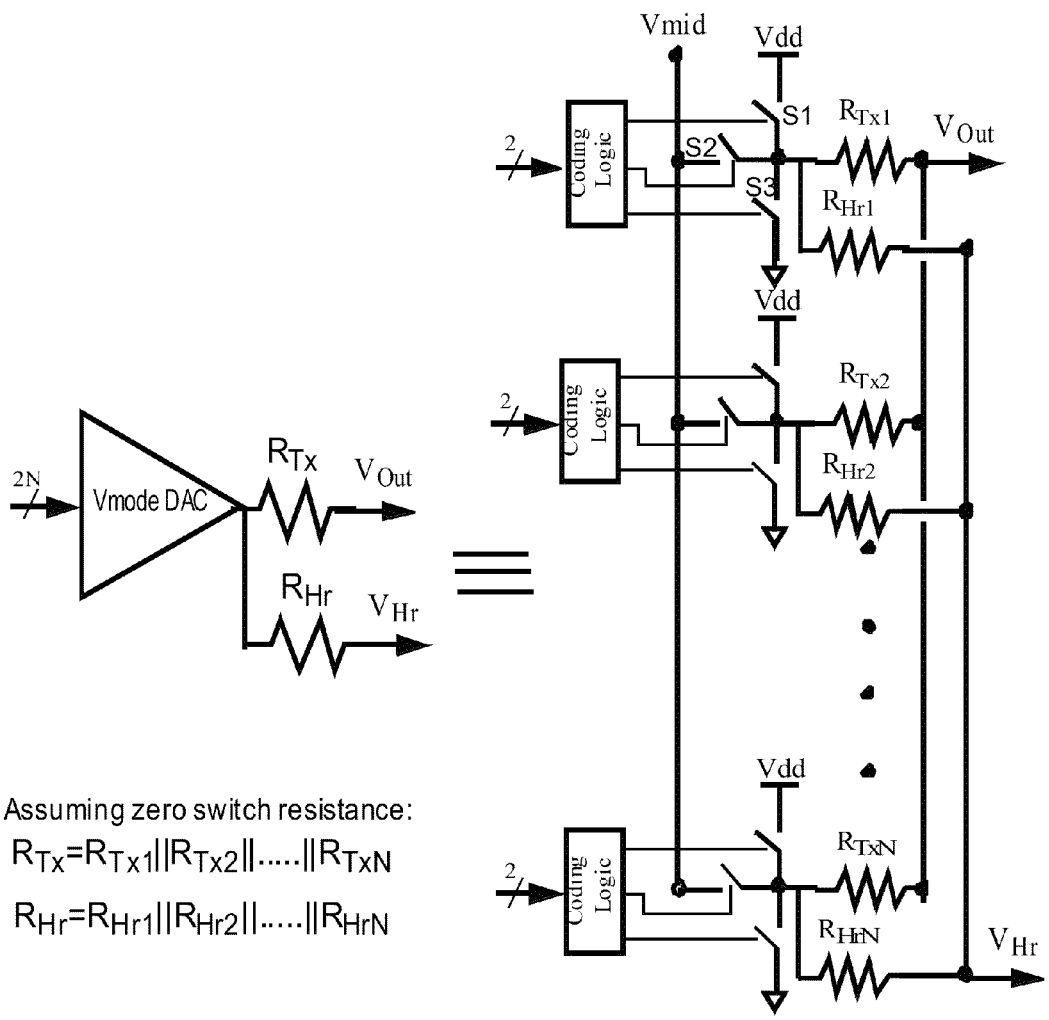
FIG. 5 illustrates further detail of the transmit hybrid circuit similar to FIG. 4, and including an additional network of hybrid resistors.

Referring now to FIG. 5, the transmit DAC also includes a hybrid impedance network consistent with the impedance network shown in FIGS. 3d-3f, and similar to the transmit impedance network shown in FIG. 4. The resistor finger circuits 402a, 402b, etc. include a further network of fixed resistors $R_{Hr1}$-$R_{HrN}$ that each couple the switches output node Vsw (we need to add Vsw that to FIG. 5) and a hybrid voltage node $V_{Hr}$. The hybrid network resistors tap off the switched-in voltages provided to corresponding transmit network resistors, and thus in aggregate provide a voltage at the hybrid node $V_{Hr}$ that is substantially matched to the transmit output voltage $V_{out}$, as long as $R_{Hrj}$ resistors are substantially equal to $R_{Txj}$ resistors, and the impedance connected to node $V_{Hr}$ (i.e. $R_{Tr}$) and impedance at Vout (Zout) are substantially the same. Alternatively, in a general case, we should have $R_{Hrj}/R_{Tr}$ to be substantially equal to $R_{Txj}/Zout$ in order to ensure $V_{Hr}$ substantially matches $V_{out}$. The hybrid voltage is then subtracted in the receiver from the line signal that is a superposition of received signal from far end and transmitted signal, e.g. feeding $V_{Hr}$ to the inverting input of a receiver for summation with the transmit voltage Vout. This effectively cancels the transmit voltage from the desired receive voltage from the bidirectional signaling link.

While the transmit hybrid circuit described above provides significant improvements in cancelling the effects of the transmit signal at the receiver, in some cases there still may be a mismatch between the transmit voltage and the hybrid voltage. However, the mismatch is more linear in nature, and thus can be straightforwardly compensated by linear compensation techniques provided in the receiver circuitry.

Figure 6:
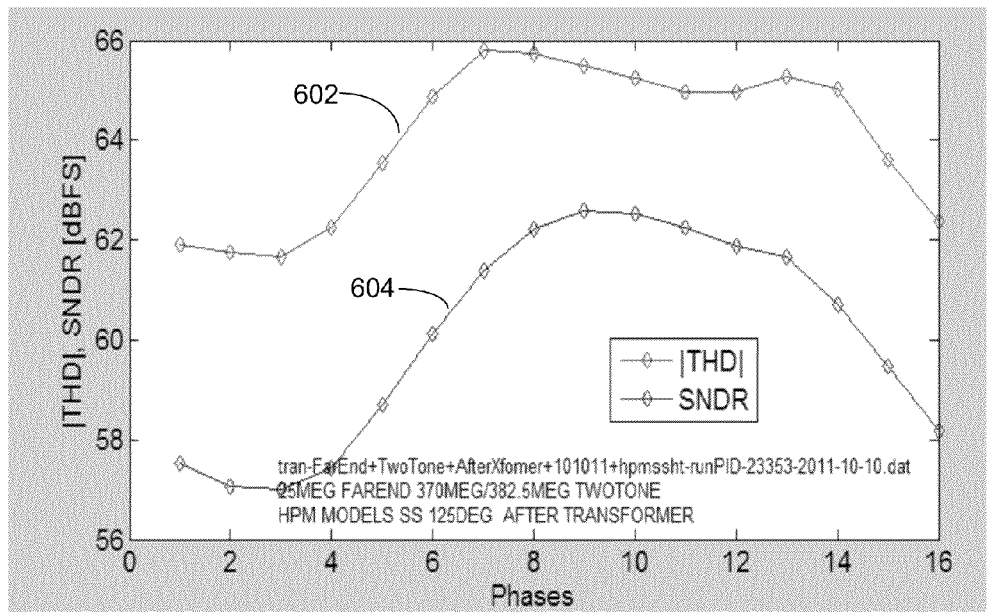
FIG. 6 illustrates performance data relating to the output of the DAC for the transmit hybrid circuit of FIG. 5.
Figure 7:
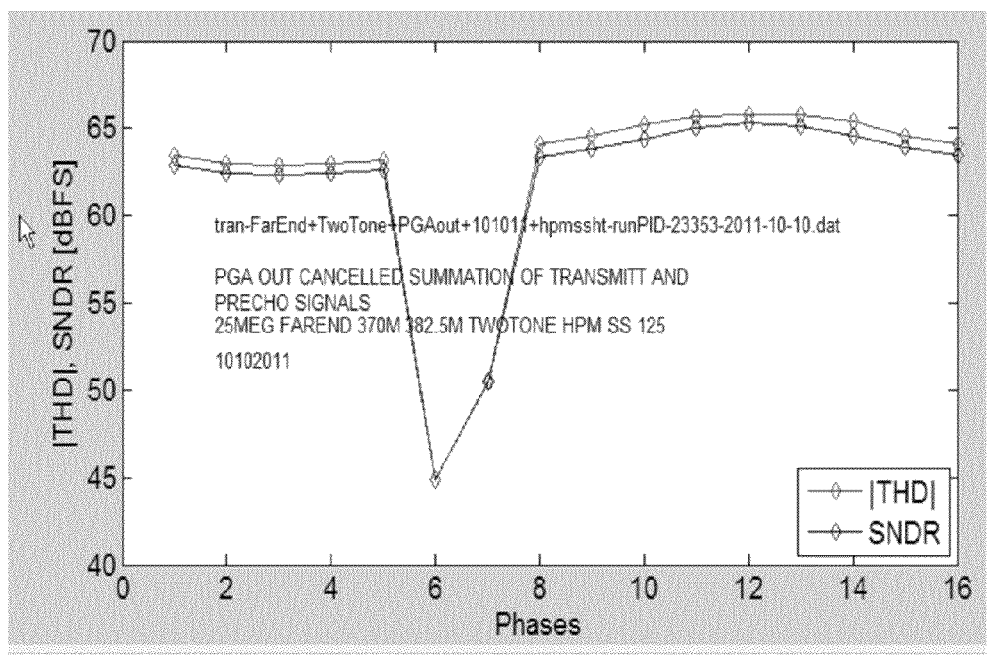
FIG. 7 illustrates additional performance data following the transmit hybrid circuit cancellation.

FIGS. 6 and 7 highlight the performance of the transmit hybrid circuit described herein. FIG. 6 shows the total harmonic distortion (THD) of the transmit signal 602 and the signal-to-noise ratio SNDR 604 at the output $V_{out}$ of the DAC of FIG. 5 as a function of different sampling phases across the output symbol period. The level of noise present is on the order of around 60 dB. FIG. 7 illustrates a similar graph with respect to the output of the receiver, and showing a range of sampling phases where both THD and SNDR are above 60 dB level for majority of the sampling phases, which is within the desired range for high-speed Ethernet applications such as 10GBASE-T.

Those skilled in the art will appreciate the benefits and advantages afforded by the transceiver circuitry and method described above. By utilizing a single voltage mode DAC with separate transmit and hybrid impedance networks to generate the respective transmit output voltage and the hybrid output voltage, an accurate and power-efficient cancellation of the transmit voltage at the receiver may be implemented. This is especially useful for high-speed ethernet applications such as 10GBASE-T.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<span style="text-decoration:overline">signalname</span>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. A voltage mode transceiver having an input/output (I/O) node for coupling to a bidirectional signaling link, the transceiver comprising:
   a transmit circuit having an output coupled to the node, the transmit circuit including
      a transmit digital-to-analog converter (DAC) circuit including
         a transmit impedance network to generate an analog transmit version of a digital data signal, wherein the analog transmit version of the data signal comprises a signal having one of at least three possible voltage levels, and
         a hybrid impedance network coupled to the transmit impedance network to generate an analog minor version of the digital data signal; and
   a receive circuit having a first input coupled to the I/O node, and a second input coupled to receive the analog mirror version of the digital data signal;
   wherein the transmit circuit and the receive circuit are operable to transmit and receive signals along the bidirectional signaling link simultaneously.

2. The transceiver according to claim 1 wherein the bidirectional signaling link exhibits a characteristic impedance and the receive circuit includes a receiver impedance network, and wherein:
   the transmit impedance network, the hybrid impedance network, and the receiver impedance network substantially match the characteristic impedance of the bidirectional signaling link.

3. The transceiver according to claim 2 wherein the hybrid receiver impedance network is interposed between the transmit impedance network and the receiver impedance network.

4. The transceiver according to claim 1 wherein:
   the transmit impedance network comprises a plurality of resistor branches disposed in parallel for selective activation by a control circuit, each resistor branch including first and second resistors joined at a common output node, the first resistor coupled to a first power supply voltage, the second resistor coupled to a second power supply voltage.

5. The transceiver according to claim 4 wherein the first power supply voltage comprises $V_{DD}$, and the second power supply voltage comprises $V_{SS}$.

6. The transceiver according to claim 1 wherein:
   the transmit impedance network comprises a plurality of resistor branches disposed in parallel for selective activation by a control circuit, each resistor branch including first, second and third resistors joined at a common output node, the first resistor coupled to a first power supply voltage of a first value, the second resistor coupled to a second power supply voltage of a second value, and the third resistor coupled to a voltage source having a third value between the first and second values.

7. The transceiver according to claim 1 wherein:
the hybrid impedance network comprises a plurality of resistor branches disposed in parallel for selective activation by a control circuit, each resistor branch including first and second resistors joined at a common output node, the first resistor coupled to a first power supply voltage, the second resistor coupled to a second power supply voltage.

8. The transceiver according to claim 7 wherein the first power supply voltage comprises $V_{DD}$, and the second power supply voltage comprises $V_{SS}$.

9. The transceiver according to claim 8 wherein:
the hybrid impedance network comprises a plurality of hybrid resistor branches disposed in parallel for selective activation by the control circuit, each hybrid resistor branch including first, second and third hybrid resistors joined at a common output node, the first hybrid resistor coupled to a first power supply voltage of a first value, the second hybrid resistor coupled to a second power supply voltage of a second value, and the third hybrid resistor coupled to a voltage source having a third value between the first and second values.

10. The transceiver according to claim 1 embodied as a 10GBASE-T Ethernet transceiver circuit.

* * * * *